United States Patent
Kubo (10) Patent No.: US 9,393,726 B2
(45) Date of Patent: Jul. 19, 2016

(54) RESIN MOLDING DIE, RESIN MOLDING METHOD AND RESIN MOLDED PRODUCT

(71) Applicant: Toshihide Kubo, Kanagawa (JP)

(72) Inventor: Toshihide Kubo, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 14/372,545

(22) PCT Filed: Feb. 1, 2013

(86) PCT No.: PCT/JP2013/052959
§ 371 (c)(1),
(2) Date: Jul. 16, 2014

(87) PCT Pub. No.: WO2013/121987
PCT Pub. Date: Aug. 22, 2013

(65) Prior Publication Data
US 2014/0367888 A1    Dec. 18, 2014

(30) Foreign Application Priority Data

Feb. 13, 2012 (JP) .................................. 2012-028719

(51) Int. Cl.
*B29C 45/17* (2006.01)
*B29C 45/26* (2006.01)
(Continued)

(52) U.S. Cl.
CPC ............ *B29C 45/17* (2013.01); *B29C 45/2602* (2013.01); *B29C 45/4435* (2013.01); *B29C 45/2628* (2013.01); *B29C 45/37* (2013.01); *B29C 2045/445* (2013.01); *B29K 2101/00* (2013.01)

(58) Field of Classification Search
CPC ..................... B29C 2045/445; B29C 45/4435; B29C 45/37

USPC ........................................... 425/577; 264/318
See application file for complete search history.

(56) References Cited

U.S. PATENT DOCUMENTS 4,792,297 A * 12/1988 Wilson ...................... 425/192 R
5,667,616 A *  9/1997 Funawatari ................... 156/245
(Continued)

FOREIGN PATENT DOCUMENTS

CN      201863352 U    6/2011
EP        0916471 A1    5/1999
(Continued)

OTHER PUBLICATIONS

International Search Report for PCT/JP2013/052959 dated Apr. 23, 2013.
(Continued)

*Primary Examiner* — Alison L Hindenlang
*Assistant Examiner* — Mohamed K Ahmed Ali
(74) *Attorney, Agent, or Firm* — Sughrue Mion, PLLC (57) ABSTRACT

It is an object of this invention to provide a resin molding die that is capable of suppressing, even when an undercut is provided on a core mold and an embossing process is performed on a cavity mold, generation of burrs attributed to the undercut and the embossing process. A resin molding die (1) of this invention includes: a core mold (4) including a protrusion (11) formed on a surface thereof as an undercut, the protrusion (11) being provided so as to form a through hole (105) in a resin-molded product (100); and a cavity mold (5) provided so as to be engageable with the core mold (4). The cavity mold (5) includes: a cavity main body (13) including an embossed surface that is opposed to the surface of the core mold (4), on which the protrusion (11) in provided, under a state in which the cavity mold (5) and the core mold (4) are engaged with each other; and an insert (15) provided to the cavity main body (13) so as to abut on the protrusion (11), the insert (15) including a mirror-finished surface as an opposing surface (23) thereof that abuts on the protrusion (11).

6 Claims, 12 Drawing Sheets

(51) Int. Cl.
    *B29C 45/44*    (2006.01)
    *B29C 45/37*    (2006.01)
    *B29K 101/00*   (2006.01)

(56) References Cited

U.S. PATENT DOCUMENTS

| 6,071,111 | A  | * | 6/2000  | Doke et al. ................... 425/412 |
| 6,235,231 | B1 |   | 5/2001  | Martin |
| 2005/0074286 | A1 |   | 4/2005  | Swistak et al. |
| 2005/0227042 | A1 | * | 10/2005 | Cowelchuk et al. .......... 428/137 |
| 2005/0236727 | A1 |   | 10/2005 | Niewels |
| 2007/0090570 | A1 | * | 4/2007  | Cochran ............. B29C 45/4407 264/318 |

FOREIGN PATENT DOCUMENTS

| JP | 59-067217 U   | 5/1984  |
| JP | 59-107508 A   | 6/1984  |
| JP | 02-146013 U   | 12/1990 |
| JP | 05-212752 A   | 8/1993  |
| JP | 06-134811 A   | 5/1994  |
| JP | 2002-205324 A | 7/2002  |
| JP | 2003-320555 A | 11/2003 |
| JP | 2005-169818 A | 6/2005  |
| JP | 2008-044376 A | 2/2008  |
| JP | 2009-297947 A | 12/2009 |
| WO | 2007/129673 A1 | 11/2007 |

OTHER PUBLICATIONS

Written Opinion for PCT/JP2013/052959 dated Apr. 23, 2013.
Communication dated Apr. 27, 2015, issued by the State Intellectual Property Office of P.R. China in counterpart Chinese application No. 201380007770.2.
Communication dated Jun. 22, 2015 from European Patent Office issued in corresponding European application No. 13748653.6.

* cited by examiner

RESIN MOLDING DIE, RESIN MOLDING METHOD AND RESIN MOLDED PRODUCT

CROSS REFERENCE TO RELATED APPLICATIONS

This application is a National Stage of Internatioanl Application No. PCT/JP2013/052959 filed Feb. 1, 2013, claiming priority based on Japanese Patent Application No. 2012-028719 filed Feb. 13, 2013, the contents of all of which are incorporated herein by reference in their entirely.

TECHNICAL FIELD

This invention relates to a resin molding die, a resin molding method, and a resin-molded product.

BACKGROUND ART

A resin molding die includes a core mold generally having a shape corresponding to an inner surface of a resin-molded product and a cavity mold provided so as to be engageable with the core mold and generally having a shape corresponding to an outer surface of the resin-molded product.

In such a resin molding die, a space (cavity), which is formed under a state in which the core mold and the cavity mold are engaged with each other, has a shape corresponding to the resin-molded product, and a molten resin is injected into the cavity to be cured. In this manner, the resin-molded product is manufactured (Patent Literatures 1 and 2).

In this case, after the resin is cured, it is necessary to separate the core mold and the cavity mold to take out the resin-molded product from the resin molding die. However, when an uneven shape or a through hole that intersects with (is orthogonal to) the separating direction (mold removal direction) is formed on or in the resin-molded product, the resin-molded product cannot be taken out from the resin molding die as it is.

Such a shape is referred to as "undercut".

In a die for molding the resin-molded product comprising an undercut, the following method is known. A portion at which the undercut is formed is provided as an independent component, and the component is removed while being moved in a direction different from the mold removal direction, to thereby take out the resin-molded product from the resin molding die (Patent Literature 3).

In this case, when the undercut is a through hole that is formed perpendicularly to the mold removal direction for the resin-molded product, the undercut may need to be provided on the core mold.

Specifically, a pin-like protrusion corresponding to the through hole is provided on the core mold, and a peripheral part of the protrusion is provided as a slide core, which is movable in a direction that is inclined with respect to the mold removal direction.

On the other hand, when three-dimensional decoration called "embossed surface" is provided on a surface of the resin-molded product, a process of engraving a pattern called "embossing process" needs to be performed on an inner wall of the cavity mold (Patent Literature 4).

CITATION LIST

Patent Literature

Patent Literature 1: JP-A-H05-212752
Patent Literature 2: JP-U-H02-146013
Patent Literature 3: JP-A-2002-205324
Patent Literature 4: JP-U-S59-067217

DISCLOSURE OF THE INVENTION

Problems to be Solved by the Invention

However, when resin molding is performed as described above under a state in which the core mold comprising the undercut corresponding to the through hole provided thereon and the embossed cavity mold are combined with each other, there is a problem in that burrs attributed to the embossed surface are generated at a periphery of the through hole.

Further, even when the burrs are not generated at the beginning of manufacturing using the resin molding die, through mass production of resin-molded products, the burrs are generated on most dies. Even in a case where the burrs are to be trimmed after the molding, there is no problem when the burrs are so small as to be blown off by air. However, when the burrs cannot be blown off by the air, it is necessary that the burrs be trimmed from the surface of the product, and when the burrs adhere on the embossed surface, it is difficult to finish the resin molded product. Therefore, there is no measure but to repair the die.

As a measure against the problems, a method involving masking a surface of the cavity mold that is opposed to the undercut is conceivable. However, the core mold and the cavity mold are independent members, and hence positioning of the masking is difficult. Therefore, there is a problem in that the burrs are difficult to be suppressed.

Further, it is conceivable to perform the embossing process on the undercut as well. Also in this case, however, there is a problem in that the burrs are liable to be generated.

This invention has been made in view of the above-mentioned problems, and has an object to provide a resin molding die that is capable suppressing, even when an undercut is provided on a core mold and an embossing process is performed on a cavity mold, generation of burrs attributed to the undercut and the embossing process.

Means to Solve the Problems

In order to achieve the above-mentioned object, according to a first aspect of this invention, there is provided a resin molding die, including: a core mold comprising a protrusion formed on a surface thereof, the protrusion being provided so as to form a through hole comprising an undercut in a resin-molded product; and a cavity mold provided so as to be engageable with the core mold, in which the cavity mold includes: a main body comprising a first processing surface that is opposed to the surface of the core mold, on which the protrusion in provided, under a state in which the cavity mold and the core mold are engaged with each other; and an insert provided to the main body so as to abut on the protrusion, the insert comprising a second processing surface as a surface thereof that abuts on the protrusion.

According to a second aspect of this invention, there is provided a resin molding method, which is carried out by using the resin molding die according to the first aspect.

According to a third aspect of this invention, there is provided a resin-molded product, which is molded by using the resin molding method according to the second aspect.

Effect of the Invention

According to the aspects of this invention, it is possible to provide the resin molding die that is capable of suppressing, even when an undercut is provided on the core mold and an embossing process is performed on the cavity mold, generation of burrs attributed to the undercut and the embossing process.

MODE FOR EMBODYING THE INVENTION

Now, exemplary embodiments of this invention are described in detail with reference to the drawings.

First, with reference to FIGS. 1 to 4, the configuration of a resin-molded product 100 that is molded using a resin molding die 1 according to a first embodiment of this invention is described in brief.

In this case, as the resin-molded product 100, an outer frame to be used for a battery charger of a router is exemplified.

As illustrated in FIGS. 1 to 4, the resin-molded product 100 comprises a hollow box shape with an open bottom surface, and one of side surfaces 103 comprises through holes 105 formed therein.

Figure 1:
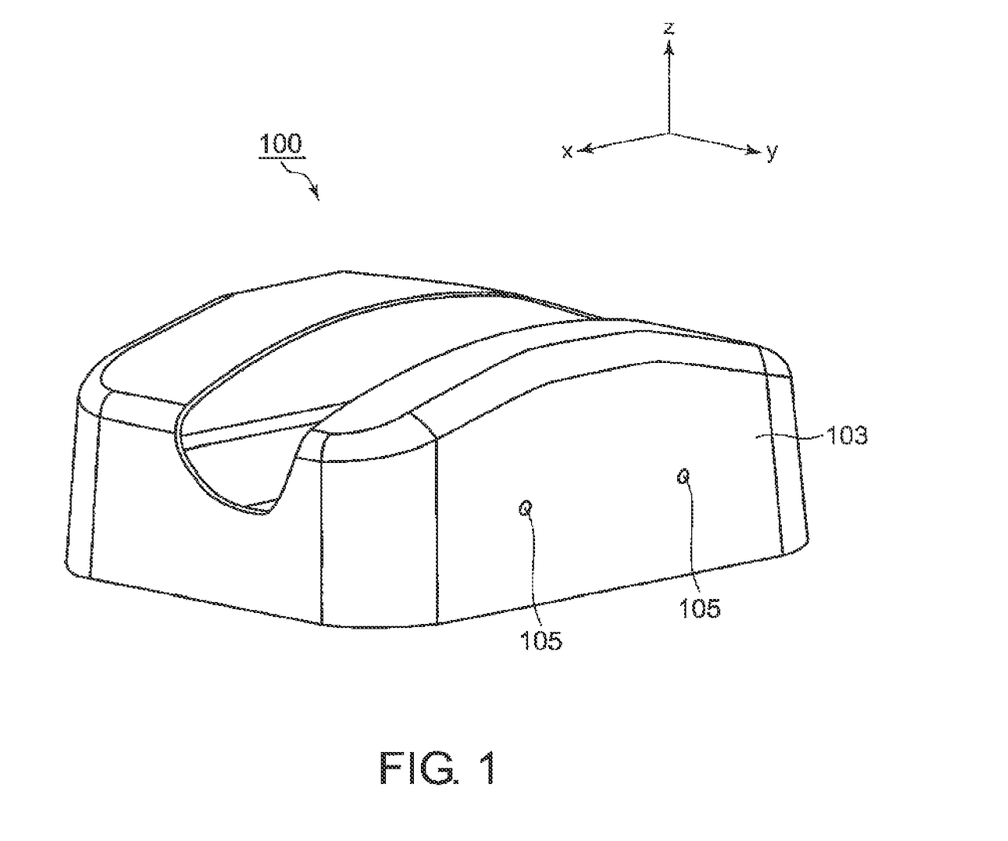
FIG. 1 is a perspective view illustrating a resin-molded product 100 that is molded by a resin molding die 1 according to a first embodiment of this invention.
Figure 2:
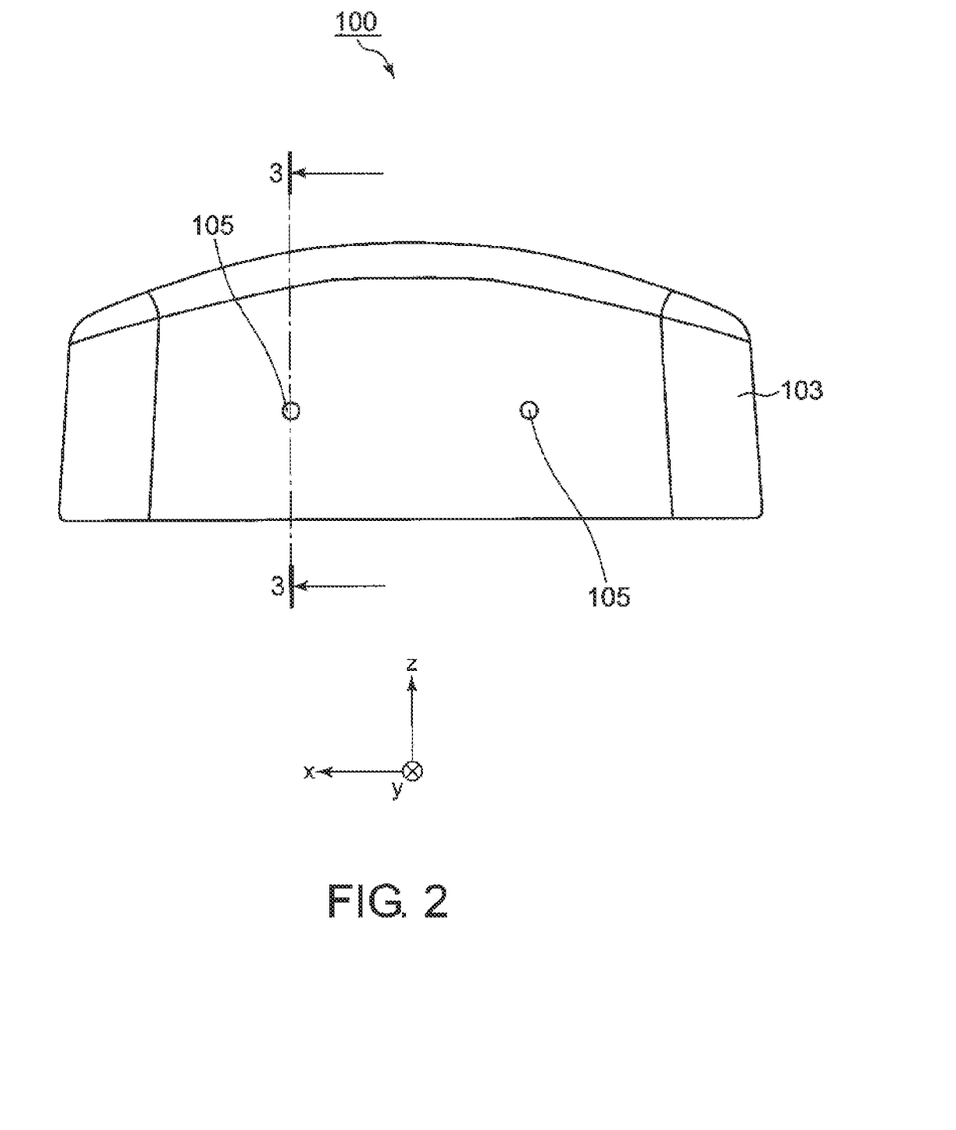
FIG. 2 is a side view of the resin-molded product 100 of FIG. 1 as viewed in the Y direction.
Figure 3:
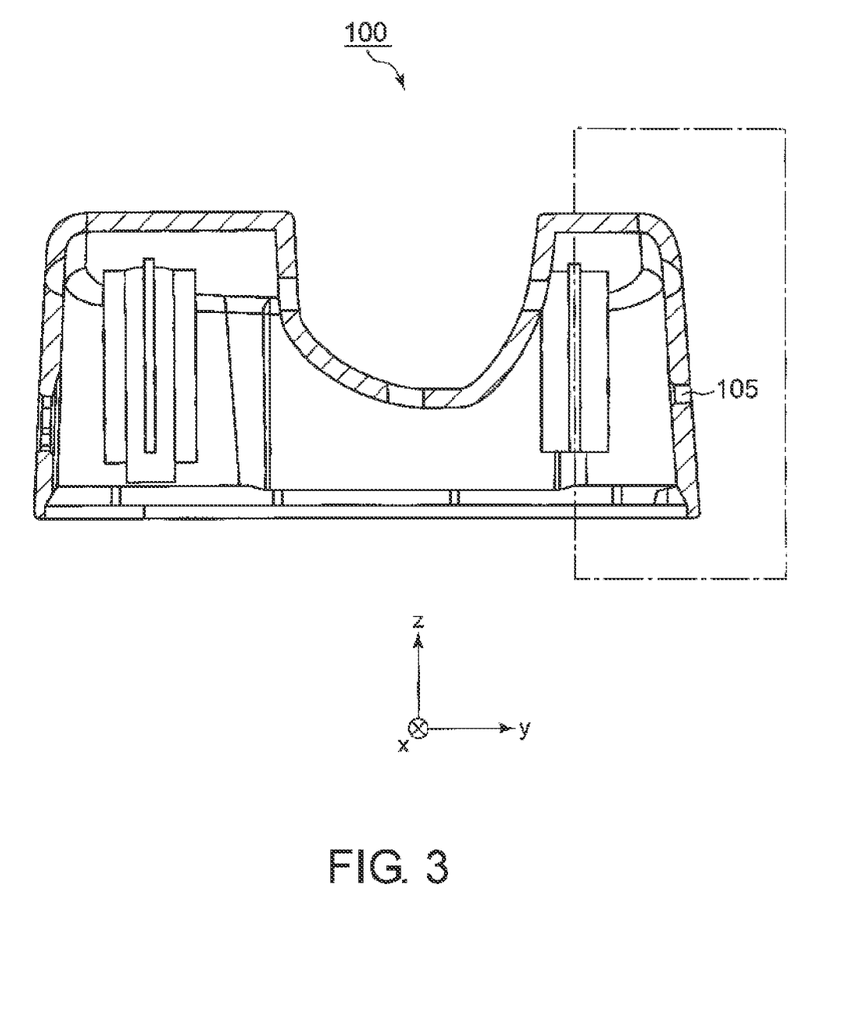
FIG. 3 is a sectional view taken along the line 3-3 of FIG. 2.
Figure 4:
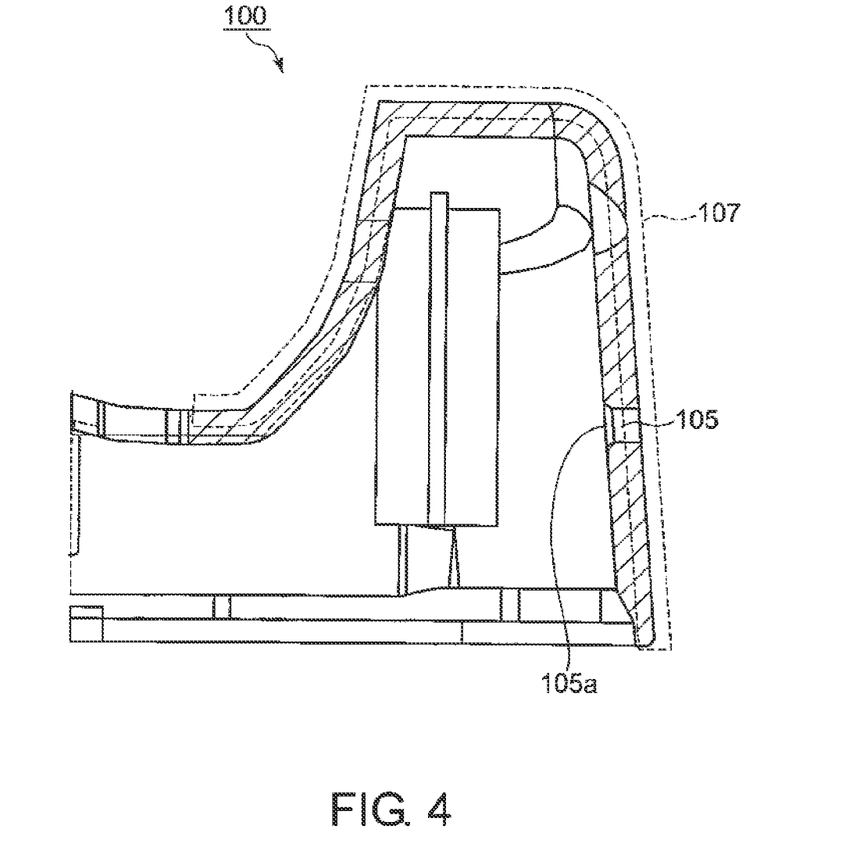
FIG. 4 is an enlarged view of a boxed region indicated by the alternate long and short dash line of FIG. 3.

As illustrated in FIG. 4, the through hole 105 comprises a tapered portion 105a radially expanded on an inner side of the side surface 103, and as described later, at the time of resin molding, the tapered portion 105a intersects with (is orthogonal to) a mold removal direction of the resin molding die 1.

Therefore, when the resin-molded product 100 is molded, the through hole 105 is an undercut, and the undercut needs to be provided on a core mold.

Note that, the through hole 105 is, for example, a hole into which an LED or the like for indicating an electrical connection state of a battery charger and a battery charging status of a router is inserted.

Further, a part 107 of an outer surface of the resin-molded product 100, which includes a periphery of the through hole 105, is an embossed surface serving as a first processing surface, and hence the embossing process needs to be performed on a cavity mold.

Next, the structure of the resin molding die 1 is described with reference to FIGS. 5 to 9.

Figure 5:
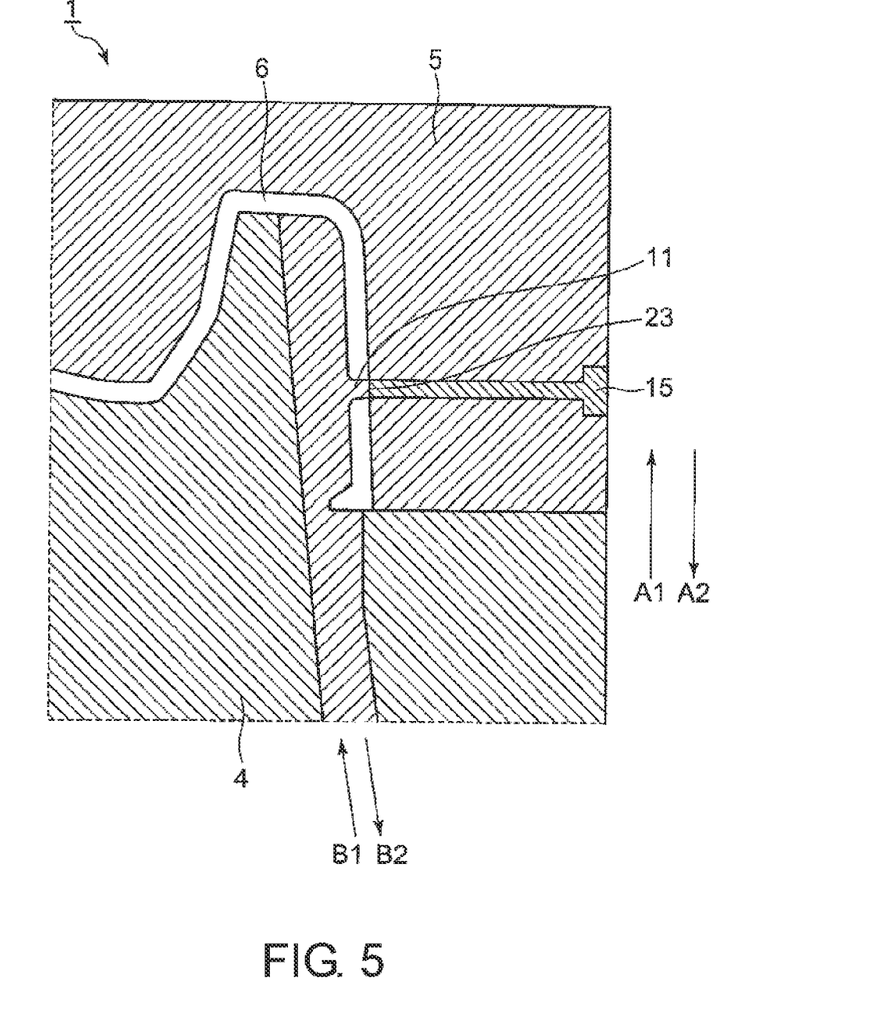
FIG. 5 is a sectional view illustrating the resin molding die 1 according to the first embodiment, and is an enlarged view of a part corresponding to FIG. 4.

As illustrated in FIG. 5, the resin molding die 1 includes a core mold 4 and a cavity mold 5 that is engageable with the core mold 4.

Although detailed description is given later, under a state in which the core mold 4 and the cavity mold 5 are engaged with each other, a cavity 6 is formed between the core mold 4 and the cavity mold 5, and a resin is filled into the cavity 6 to be cured. In this manner, the resin-molded product 100 is manufactured.

Note that, the cavity mold 5 is movable with respect to the core mold 4 in directions A1 and A2 of FIG. 5, and the directions of the movement correspond to the mold removal direction of the resin molding die 1.

Figure 6:
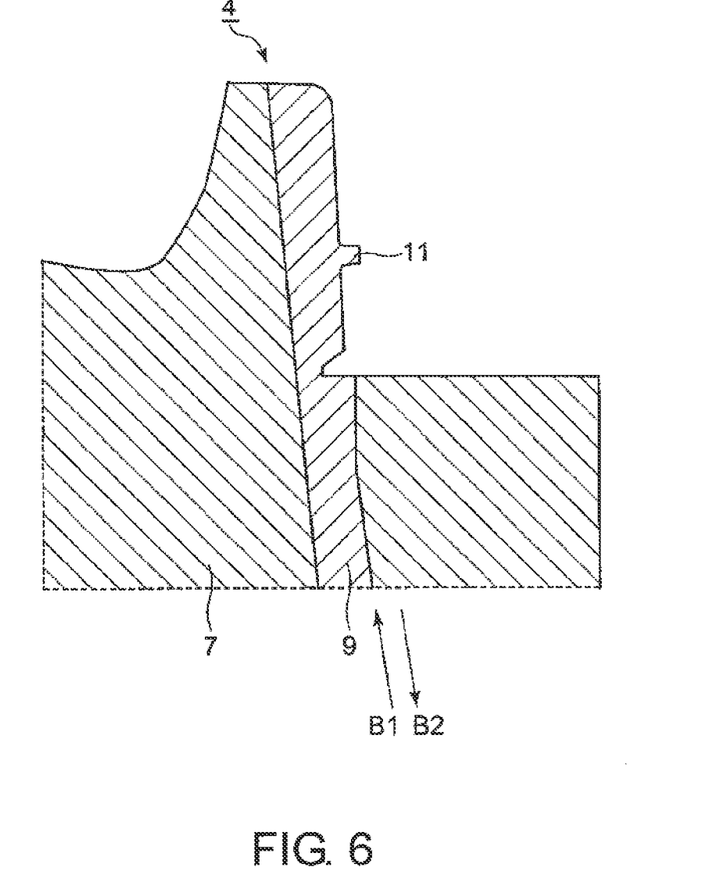
FIG. 6 is a sectional view illustrating a core mold 4.

As illustrated in FIG. 6, the core mold 4 includes a core main body 7 comprising a shape corresponding to an inner periphery of the resin-molded product 100, and a part corresponding to the through hole 105 (see FIG. 4) forms a protrusion 11. The protrusion 11 protrudes in a direction that intersects with (is orthogonal to) the mold removal direction of the resin molding die 1, and hence the protrusion 11 forms an undercut.

Further, a periphery of the protrusion 11 of the core mold 4 forms a slide mold 9 that is movable in directions B1 and B2 that are inclined with respect to the mold removal direction (directions A1 and A2) (see FIG. 5).

Figure 7:
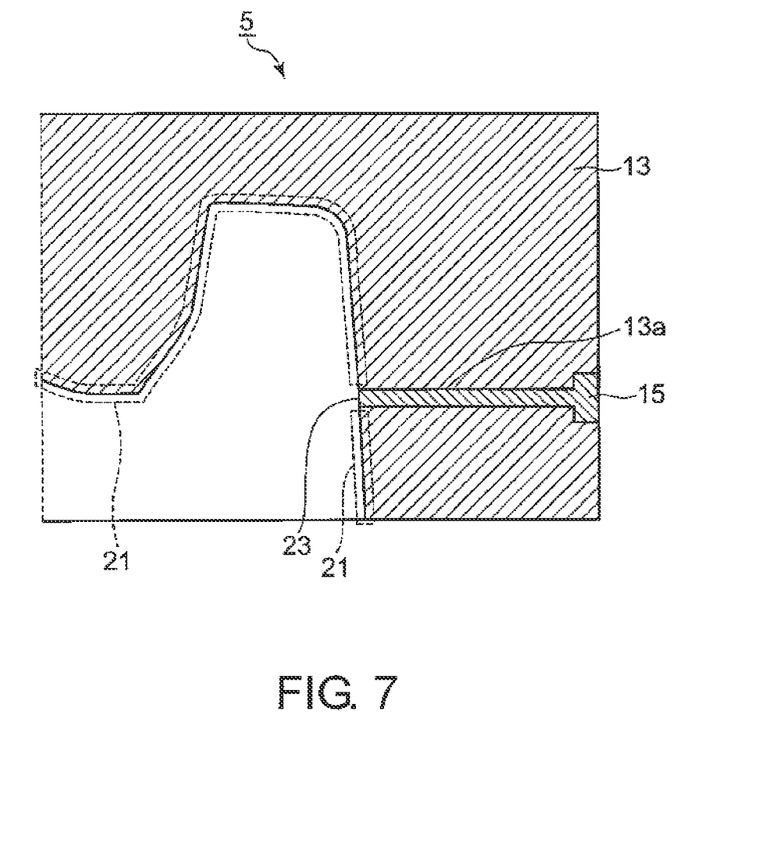
FIG. 7 is a sectional view illustrating a cavity mold 5.

As illustrated in FIG. 7, the cavity mold 5 includes a cavity main body 13 comprising an inner periphery shape corresponding to the part 107 of the outer surface of the resin-molded product 100, and a pin-like insert 15 provided so as to abut on the protrusion 11 of the core mold 4.

Note that, the cavity main body 13 comprises a hole 13a corresponding to a shape of the insert 15, and the insert 15 is removably mounted into the hole 13a.

Figures 8, 9:
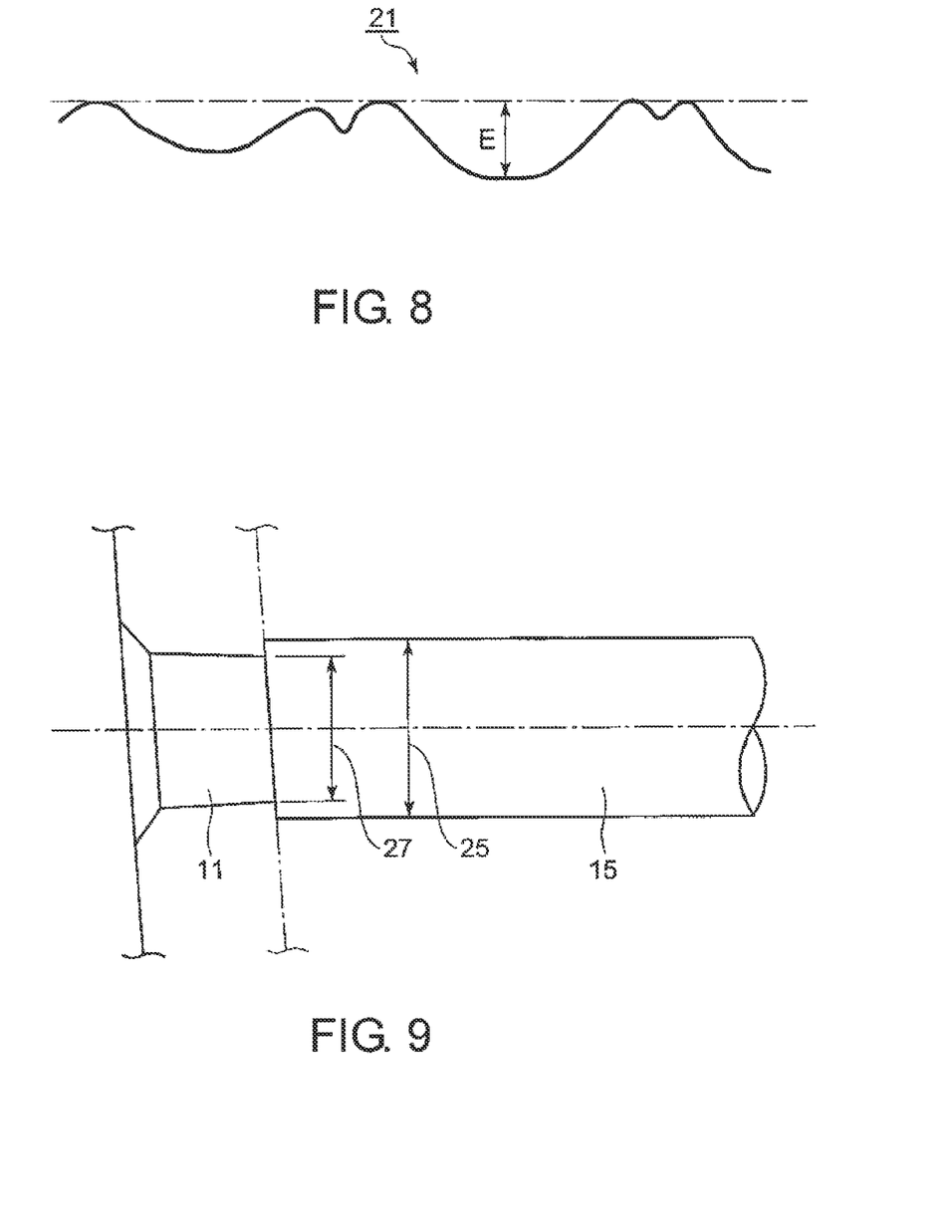
FIG. 8 is a schematic view illustrating a cross section profile of an embossed surface 21 of the cavity mold 5.
FIG. 9 is an enlarged view of a vicinity of a protrusion 11 of FIG. 5.

As described above, a portion of the cavity main body 13, which has a shape corresponding to an outer periphery of the resin-molded product 100, forms an embossed surface 21 (see FIG. 8).

The embossed surface 21 is provided so as to be opposed to a surface of the core mold 4, which comprises the protrusion 11 provided thereon, under a state in which the cavity mold 5 and the core mold 4 are engaged with each other.

Note that, regarding roughness of the embossed surface 21, for example, a maximum depth E illustrated in FIG. 8 is about 80 μm.

On the other hand, in the insert 15, a surface of an opposing surface 23, which abuts on the protrusion 11 of the core mold 4, is a mirror-finished surface serving as a second processing surface. That is, the second processing surface has surface roughness (Ra, Rmax, and the like) smaller than that of the first processing surface.

Note that, as illustrated in FIG. 9, a diameter 25 of the insert 15 is formed larger than a diameter 27 of the protrusion 11. That is, the area of the surface of the insert 15, which abuts on the protrusion 11, is formed larger than the area of a surface of the protrusion 11, which abuts on the insert 15.

Specifically, for example, the diameter 25 of the insert 15 is formed larger than the diameter 27 of the protrusion 11 by about 0.05 mm on each side, and by about 0.1 mm in diameter.

Further, under a state in which the core mold 4 and the cavity mold 5 are combined with each other, the opposing surface 23 of the insert 15 abuts on a distal end of the protrusion 11 as illustrated in FIG. 5.

Although detailed description is given later, by forming the insert 15 as described above, generation of burrs is suppressed at the time of the resin molding.

Further, in the insert 15, at least the opposing surface 23 is formed of a material having a hardness (for example, Vickers hardness) larger than that of the distal end of the protrusion 11.

By forming the insert 15 of the material as described above, the opposing surface 23 can be prevented from being deformed when the insert 15 is brought into abutment on the distal end of the protrusion 11.

Note that, the resin molding die 1 includes, in addition to the core mold 4 and the cavity mold 5, a mounting plate for fixing the core mold 4 and the cavity mold 5, springs to be used for mold removal and mold clamping, a sprue portion through which the resin is injected into the cavity, and the like. However, illustration and detailed description thereof are omitted herein.

Next, a procedure of manufacturing the resin-molded product 100 using the resin molding die 1 is described with reference to FIGS. 5, 7, and 9 to 12.

First, as illustrated in FIG. 7, the insert 15 is inserted into the hole 13a of the cavity main body 13 to be mounted thereto, and further, as illustrated in FIG. 5, the core mold 4 and the cavity mold 5 are engaged with each other to form the cavity 6 between the core mold 4 and the cavity mold 5.

In this case, as described above, under a state in which the core mold 4 and the cavity mold 5 are engaged with each other, the opposing surface 23 of the insert 15 abuts on the distal end of the protrusion 11.

Figure 10:
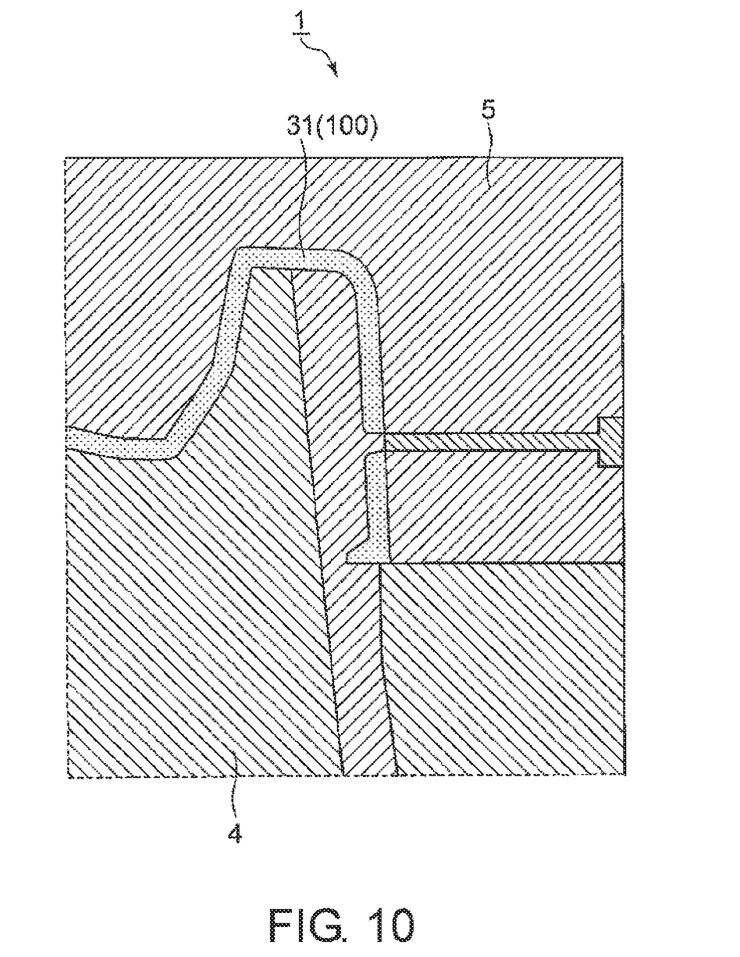
FIG. 10 is a sectional view illustrating a procedure of molding the resin-molded product 100 using the resin molding die 1.

Next, as illustrated in FIG. 10, a resin 31 is injected into the cavity 6 to be cured so that the resin-molded product 100 is formed.

In this case, the opposing surface 23 of the insert 15 abuts on the distal end of the protrusion 11, and the opposing surface 23 is mirror-finished. Further, the diameter 25 of the insert 15 is formed larger than the diameter 27 of the protrusion 11, and hence a gap is not formed between the insert 15 and the protrusion 11.

Therefore, the resin 31 is not injected between the insert 15 and the protrusion 11, and hence the burrs attributed to the embossing process are not generated at the periphery of the protrusion 11 (that is, the periphery of the through hole 105).

Figure 11:
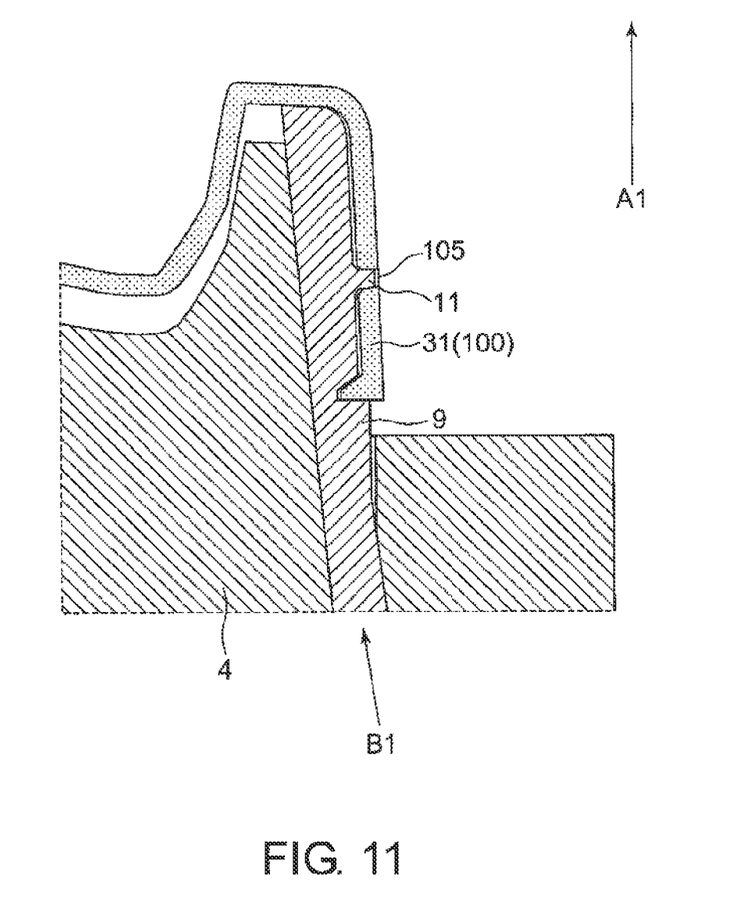
FIG. 11 is a sectional view illustrating the procedure of molding the resin-molded product 100 using the resin molding die 1.

Next, when the resin 31 is cured, as illustrated in FIG. 11, the cavity mold 5 is moved with respect to the core mold 4 in the direction A1 of FIG. 11.

When the cavity mold 5 is moved to a position at which the resin-molded product 100 can be taken out (position at which the cavity mold 5 exceeds the height of the resin-molded product 100), the slide mold 9 arranged around the protrusion 11 then slides in the direction B1 of FIG. 11. In this case, the direction of the sliding (direction B1) is inclined with respect to the mold removal direction (direction A1), and hence, along with the movement of the slide mold 9, the protrusion 11 of the slide mold 9 is moved away from the through hole 105 of the resin-molded product 100. Thus, a gap is formed between the slide mold 9 and the resin-molded product 100.

Figure 12:
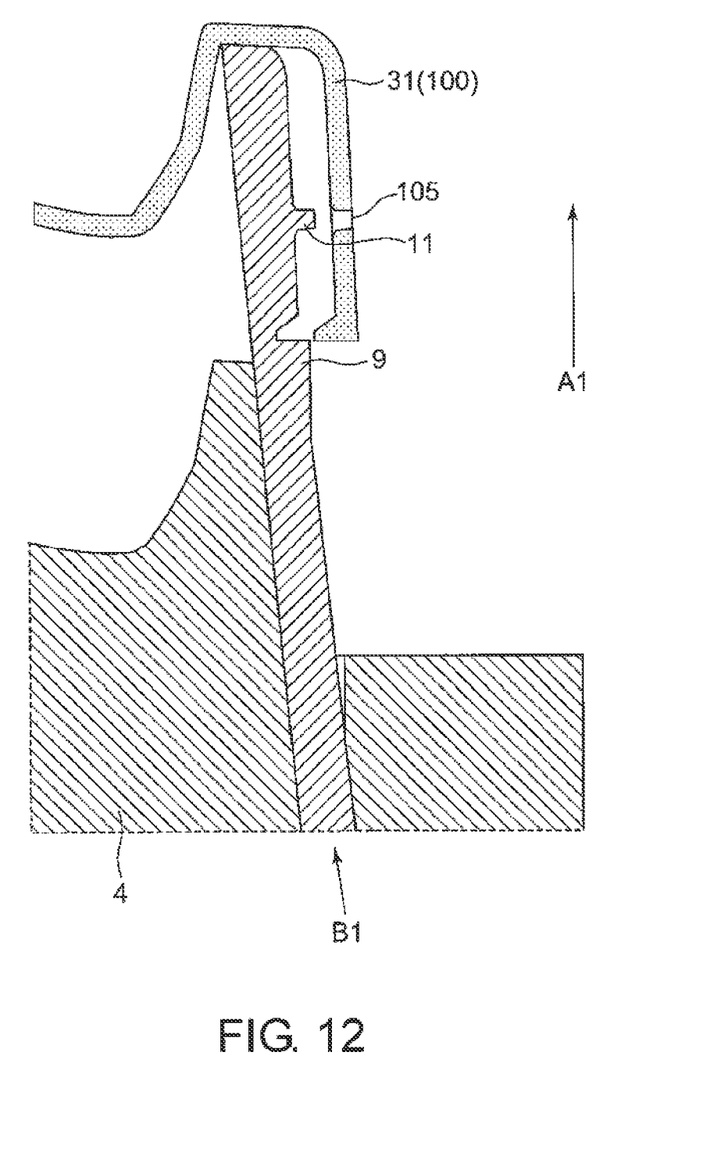
FIG. 12 is a sectional view illustrating the procedure of molding the resin-molded product 100 using the resin molding die 1.

Finally, as illustrated in FIG. 12, when the slide mold 9 moves to a position at which the resin-molded product 100 does not interfere with the slide mold 9, the resin-molded product 100 is released from the slide mold 9, and the resin-molded product 100 is taken out in the direction A1, that is, the removal direction of the resin molding die 1.

Thus, according to the first embodiment, the resin molding die 1 includes the core mold 4 comprising the protrusion 11 formed on the surface thereof as an undercut so as to form the through hole 105 in the resin-molded product 100, and the cavity mold 5 provided so as to be engageable with the core mold 4. The cavity mold 5 includes the cavity main body 13 comprising the embossed surface 21 that is opposed to the surface of the core mold 4 under a state in which the cavity mold 5 and the core mold 4 are engaged with each other, and the insert 15 provided to the cavity main body 13 so as to abut on the protrusion 11 and comprising the mirror-finished surface as the opposing surface 23 thereof that abuts on the protrusion 11.

Therefore, even when the undercut is provided in the mold removal direction and the embossed surface is provided on the periphery of the undercut, the generation of burrs can be suppressed.

Further, according to the first embodiment, the cavity main body 13 comprising the embossed surface 21 comprises a structure capable of removably mounting the insert 15 thereon, and hence, when the embossing process is to be performed on the entire surface, the cavity main body 13 can be used as it is by mounting a dummy insert 15a (not shown) comprising an embossed opposing surface 23.

Next, a second embodiment of this invention is described with reference to FIG. 13.

In the second embodiment, a fitting structure is provided to four corners of each of the core mold 4 and the cavity mold 5 of the first embodiment.

Note that, in the second embodiment, components having the same functions as those of the first embodiment are denoted by the same reference symbols, and parts different from those of the first embodiment are mainly described.

Figure 13:
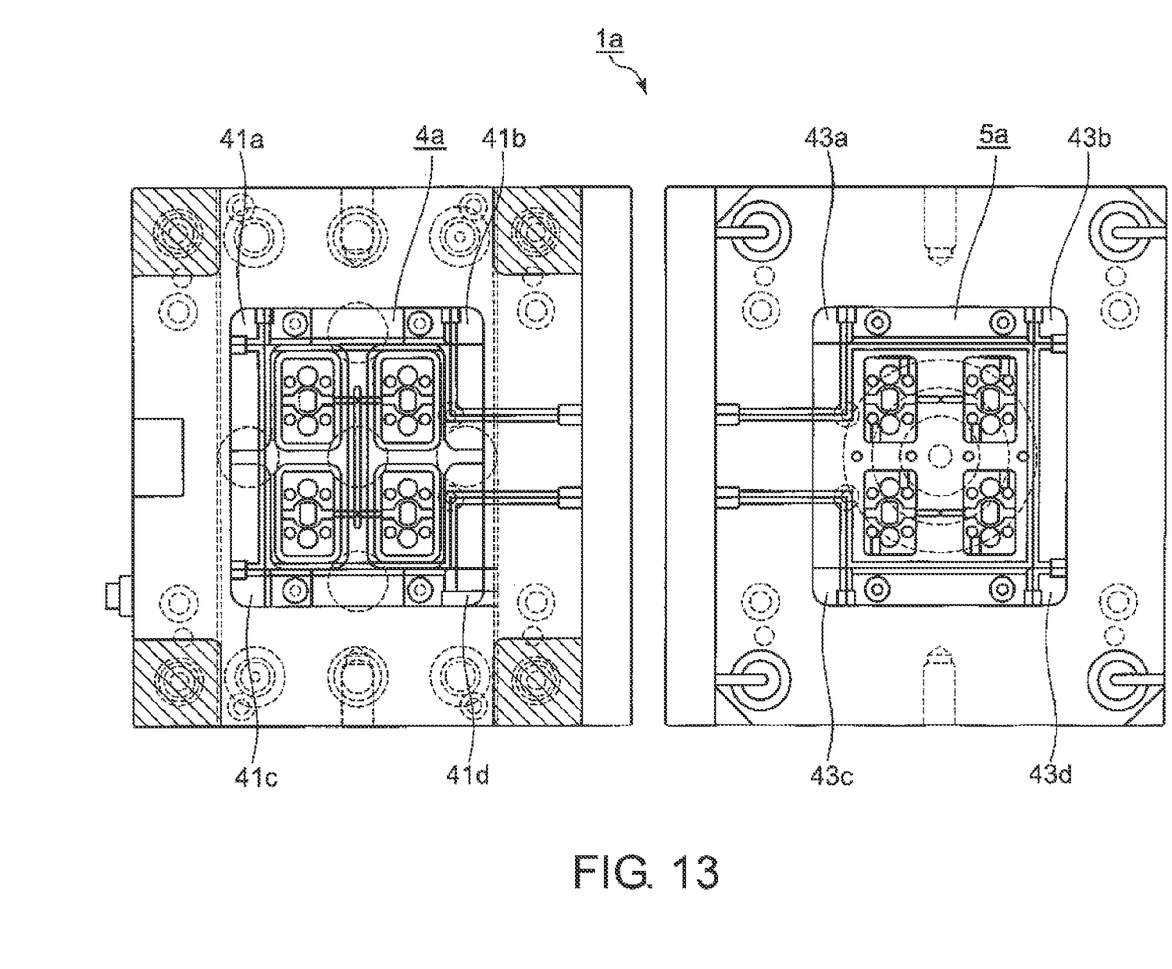
FIG. 13 is a plan view illustrating a resin molding die 1a according to a second embodiment of this invention.

As illustrated in FIG. 13, a resin molding die 1a according to the second embodiment includes a core mold 4a and a cavity mold 5a each comprising a rectangular shape in plan view.

First positioning portions 41a, 41b, 41c, and 41d are provided on four corners of the core mold 4a, respectively, and second positioning portions 43a, 43b, 43c, and 43d are provided on four corners of the cavity mold 5a, respectively. The second positioning portions 43a to 43d have shapes corresponding to those of the first positioning portions 41a to 41d, respectively. In this manner, the first positioning portions 41a to 41d and the second positioning portions 43a to 43d construct a fitting structure.

As described above, by providing the fitting structure to the core mold 4a and the cavity mold 5a, positioning can be carried out more accurately when the insert 15 is brought into abutment on the protrusion 11.

Thus, according to the second embodiment, the resin molding die 1a includes the core mold 4a comprising the protrusion 11 formed on the surface thereof as an undercut so as to form the through hole 105 in the resin-molded product 100, and the cavity mold 5a provided so as to be engageable with the core mold 4a. The cavity mold 5a includes the cavity main body 13 comprising the embossed surface 21 that is opposed to the surface of the core mold 4a, on which the protrusion 11 in provided, under a state in which the cavity mold 5a and the core mold 4a are engaged with each other, and the insert 15 provided to the cavity main body 13 so as to abut on the protrusion 11 and comprising the mirror-finished surface as the opposing surface 23 thereof that abuts on the protrusion 11.

Therefore, the same effect as in the first embodiment can be obtained.

Further, according to the second embodiment, the resin molding die 1a includes the core mold 4a and the cavity mold 5a each comprising a rectangular shape in plan view. The first positioning portions 41a, 41b, 41c, and 41d are provided on the four corners of the core mold 4a, respectively, and the second positioning portions 43a, 43b, 43c, and 43d are provided on the four corners of the cavity mold 5a, respectively. In this manner, the first positioning portions 41a to 41d and the second positioning portions 43a to 43d construct the fitting structure.

Therefore, as compared to the first embodiment, the positioning can be carried out more accurately when the insert 15 is brought into abutment on the protrusion 11.

INDUSTRIAL APPLICABILITY

This invention is described above based on the embodiments, but this invention is not limited to the embodiments.

As a matter of course, a person having ordinary skill in the art may arrive at various modifications and improvements within the scope of this invention, and it is understood that the scope of this invention encompasses those modifications and improvements.

For example, in the embodiments of this invention, as the resin-molded product 100, the outer frame to be used for a battery charger of a router is exemplified, and also the resin molding die 1 for manufacturing the resin-molded product 100 is exemplified. However, this invention is not limited thereto, and is applicable to all resin molding dies in which the undercut needs to be provided on the core mold and the embossed surface needs to be provided on the surface of the cavity mold, which is opposed to the undercut.

This application claims the priority from Japanese Patent Application No. 2012-028719, filed on Feb. 13, 2012, the disclosure of which is incorporated herein in its entirety.

REFERENCE SIGNS LIST 1 resin molding die
1a resin molding die
4 core mold
4a core mold
5 cavity mold
5a cavity mold
6 cavity
7 core main body
9 slide mold
11 protrusion
13 cavity main body
13a hole
15 insert
15a dummy insert (not shown)
21 embossed surface
23 opposing surface
25 diameter of insert 15
27 diameter of protrusion 11
31 resin
41a first positioning portion
41b first positioning portion
41c first positioning portion
41d first positioning portion
43a second positioning portion
43b second positioning portion
43c second positioning portion
43d second positioning portion
100 resin-molded product
103 side surface
105 through hole
105a tapered portion
107 part of outer surface

The invention claimed is:

1. A resin molding die, comprising:
a core mold comprising a protrusion formed on a surface thereof as an undercut, the protrusion being provided so as to form a through hole in a resin-molded product; and
a cavity mold provided so as to be engageable with the core mold,
wherein the cavity mold comprises:
a main body comprising a first processing surface that is opposed to the surface of the core mold, on which the protrusion in provided, under a state in which the cavity mold and the core mold are engaged with each other; and
an insert provided to the main body so as to abut on the protrusion, the insert comprising a second processing surface as a surface thereof that abuts on the protrusion,
wherein the first processing surface comprises an embossed surface,
wherein the second processing surface comprises a mirror-finished surface,
wherein between the first and second processing surface is a continuous surface without gaps, and
wherein an area of the surface of the insert, which abuts on the protrusion, is larger than an area of a surface of the protrusion, which abuts on the insert.

2. A resin molding die according to claim 1, wherein the protrusion is provided so that a protruding direction thereof intersects with an engaging direction in which the core mold and the cavity mold are engaged with each other.

3. A resin molding die according to claim 1, wherein the protrusion is provided so that a protruding direction thereof is orthogonal to the engaging direction in which the core mold and the cavity mold are engaged with each other.

4. A resin molding die according to claim 1, wherein at least the second processing surface of the insert is formed of a material having a hardness larger than a hardness of the protrusion.

5. A resin molding die according to claim 1,
wherein the core mold and the cavity mold each comprise a rectangular shape in plan view,
wherein the core mold comprising the rectangular shape comprises first positioning portions formed at four corners thereof, and
wherein the cavity mold comprising the rectangular shape comprises second positioning portions formed at four corners thereof so as to be engageable with the first positioning portions, respectively.

6. A resin molding die according to claim 5, wherein the first positioning portions and the second positioning portions comprise a fitting structure.

* * * * *